April 29, 1930. P. L. TENNEY 1,756,917
FOUR-SPEED TRANSMISSION
Filed June 15, 1927
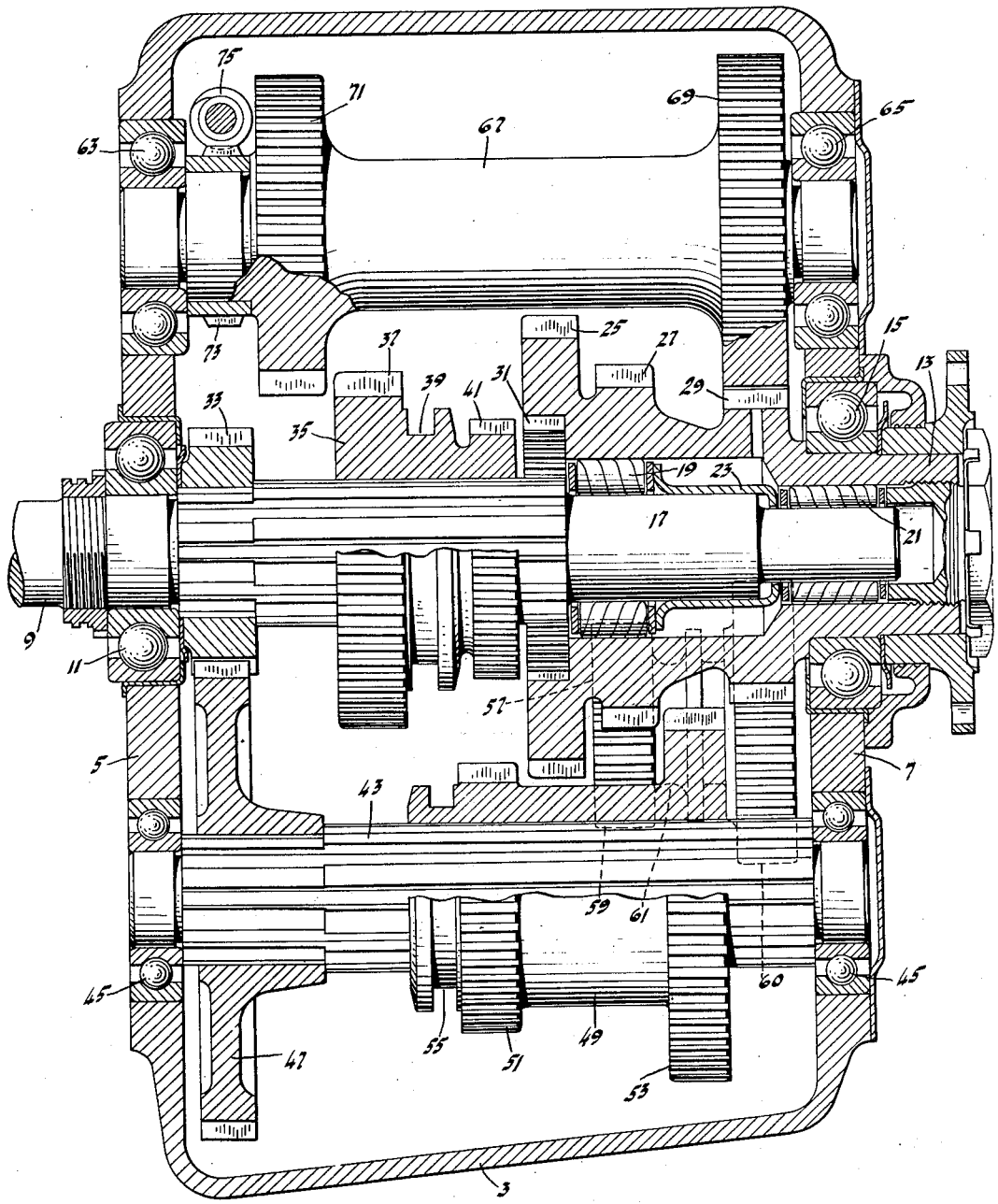

Patented Apr. 29, 1930

1,756,917

UNITED STATES PATENT OFFICE

PERRY L. TENNEY, OF MUNCIE, INDIANA, ASSIGNOR TO GENERAL MOTORS CORPORATION, OF DETROIT, MICHIGAN, A CORPORATION OF DELAWARE

FOUR-SPEED TRANSMISSION

Application filed June 15, 1927. Serial No. 199,002.

This invention relates to change speed transmission and has been designed more particularly for use on motor vehicles.

The invention has for its object to provide a four forward speed transmission together with a reverse drive. As a further object the invention seeks to secure a comparatively quiet operating mechanism for the higher speed ratios. Among other objects are gear arrangements to facilitate shifting of gears, the provision of simple and effective bearing supports for the rotatable parts, and a convenient power takeoff for the driving of a speedometer or other measuring instrument.

Other objects and advantages will appear from the following description and from an examination of the accompanying drawing.

The drawing illustrates the improved transmission unit in longitudinal section.

Referring to the drawing by reference characters, numeral 3 designates the housing having a front wall 5 and a rear wall 7. Within the front end of the housing there enters a driving shaft 9, bearings therefor being shown at 11 suitably supported in the front wall. Entering from the rear is a driven shaft 13 through bearings 15 in the rear wall 7. This driven shaft is shown as having an enlarged open inner end, in which open end is received the reduced end 17 of driving shaft 9. Rotatably supporting the reduced end 17 of driving shaft 9 within the open inner end of driving shaft 13 are two sets of roller bearings 19 and 21, spacing means 23 being positioned between the bearings. It will be seen that the bearing member 21 is in alignment with bearing member 15 for the driven shaft. The driven shaft within the housing is provided with three gear members 25, 27 and 29. Within the gear member 25, the innermost of the three gears, are shown clutch teeth 31. The driving shaft 9 has rigidly secured thereto a driving gear 33. This driving shaft 9 between gear 33 and its reduced portion 17 is splined and slidably mounted on the spline portion is a gear member 35. This gear member 35 has external gear teeth 37, is formed with a collar 39 to engage a shifting fork not shown, and at its other end is provided with clutch teeth 41 to engage clutch teeth 31.

By the construction thus far described it will be seen that the driving and driven shafts are mounted in alignment, each having a bearing in one of the end walls. One of these shafts, the drive shaft, is piloted within the open end of the other and anti-friction means are provided in said open end between the two shafts in alignment with the bearing in the wall of the housing. A very substantial support is thus provided for the driving and driven shafts and a very simple arrangement for mounting the two shafts.

A splined countershaft 43 is rotatably mounted in bearings 45 in the front and rear walls of the housing. This splined countershaft carries the gear 47 rigidly secured thereto, which gear is in constant meshed engagement with gear 33 on the driving shaft 9. Slidably but non-rotatably mounted on the spline portion of shaft 43 is a double gear member 49 having gear teeth 51 for its front end and 53 at its rear end. Just in advance of gear teeth 51 is a collar 55 for engaging a sliding shifter fork not illustrated in the drawing.

Shown by dotted lines in the figure is a reverse idler gear 57. This reverse idler gear is double and is formed with a set of gear teeth 59 at its front end and a set of gear teeth 60 at its rear end. Between the two ends is a collar 61 for the sliding fork, not shown. It will be observed from the drawing that the idler gear is normally out of gear engagement with the gears of the driving shaft and of the countershaft.

Bearings 63 in the front wall and 65 in the rear wall of the housing support a second countershaft 67 parallel with the aligned shafts and with the first countershaft. This second countershaft has rigid therewith a rear gear member 69 in constant driving engagement with gear teeth 29 of the driven shaft. It also has rigid therewith a gear member 71 normally out of contact with the sliding gear on the driving shaft. This second rotating countershaft is formed with a pinion 73 just in advance of gear member 71. This pinion 73 is intended to be engaged with the driving gear 75 transversely positioned in the housing, which gear 75 is intended for a detachable connection with a flexible speedometer driving cable in the usual manner.

The drawing illustrates the several parts of the transmission in their neutral positions. When in this position it will be observed that countershaft 43 is in constant rotatable relation with the driving shaft 9 through the engagement of gears 33 and 47. It will also be seen that the driven shaft 13 is in constant driving engagement with the countershaft 67 by means of the engaging gear members 29 and 69. For the purpose of starting the car in low speed gear member 49 is shifted to the rear so that its teeth 51 engage gear teeth 25. When, therefore, the clutch is engaged to drive shaft 9 the driven shaft is driven through two gear trains comprising gears 33 and 47, and gears 51 and 25. Second speed is obtained by shifting slidable gear 49 forward so that gear 53 meshes with gear 27. Third speed is obtained by restoring sliding gear 47 to its neutral position shown in the drawing and thereafter sliding clutch members 41 and 31 into engagement, whereupon the driving shaft and driven shaft rotate as one. Should it be desired to drive at a higher rate the driven shaft may be rotated at a speed greater than the driving shaft through the intermediary idler 67. For this purpose the sliding member 35 is pushed forward so that its teeth 37 engage teeth 71. The ratios of the gear members are such as to drive the driven shaft at a speed above the driving shaft. The advantage of this provision is not merely to secure higher speeds for the car but to permit a lower engine speed for a given car speed resulting in economy in fuel and a more advantageous use of the motor's power. For driving in reverse the gear 49 remains in its neutral position as shown in the figure and the reverse idler 57 is moved forward so that its teeth 59 engage teeth 25 and its teeth 60 engage gear teeth 53.

The construction described above provides a lay shaft to effect an overgear, the lay shaft being in constant mesh with the final drive gear. The direct speed is the third speed and is obtained by clutching the driving and driven shafts together. The overdrive gears have no function other than for the purpose of the high speed and, therefore, may be so proportioned and designed as to secure the utmost in quiet running. The positions of the several bearings are such as to give the gears the best possible support against bearing fatigue and shaft deflections. The second speed, low speed and reverse are accomplished through the means of a lay shaft constantly driven by gears at the front of the transmission housing. The speed ratios for second and low speed are obtained by a sliding gear on the lay shaft meshing with appropriate gears on the final driven shaft. The reverse idler is a two-step gear member which may be brought into engagement by sliding on its shaft with a countershaft gear and the low gear member of the driven shaft. It will be observed that this idler is so positioned as to be entirely out of mesh when the transmission is in overgear, in direct gear, in second, and in neutral. When driving in low gear the reverse idler is turning freely and is only under load when it is performing its duty in driving in reverse.

This gear arrangement gives a very convenient way of driving the speedometer. The speedometer is driven from the forward end of the overgear lay shaft. This brings the speedometer cable out of the transmission at the front and under the floor boards. This also provides ideal lubrication for the speedometer gears by placing them within the transmission housing and permits the use of present types of interchanges for speedometer gears. One particularly striking difference from the conventional arrangement is the reversal of the gear lay out, fore and aft. This construction permits a very favorable bearing support for the driving and driven shafts.

When making gear shifts the overgear shaft, being in gear engagement with the driven shaft, does not add its weight to the mass which freely spins when the transmission is declutched. This, of course, facilitates gear shifting.

I claim:

1. In a transmission, aligned shafts, a first one of said shafts having a plurality of gears, slidable means on a second of said shafts to clutch said shafts for direct driving, a first countershaft, slidable gears on said first countershaft for engaging selectively with gears of the first one of said aligned shafts, together with an additional gear on the first mentioned of the aligned shafts, a second countershaft having a gear in mesh with said last mentioned aligned shaft gear, an additional gear on said second countershaft and gear means on said second mentioned aligned shaft to engage the second mentioned gear of the second counter shaft.

2. The invention defined by claim 1, said last mentioned gear means being integral with the slidable clutch means.

3. In a transmission mechanism, a driving shaft, an aligned driven shaft, two parallel counter shafts through either of which the driving shaft may drive the driven shaft, the first one of said counter shafts being in constant geared engagement with the driving shaft, the second one of said counter shafts being in constant geared engagement with the driven shaft, shiftable means to effect a drive engagement between each counter shaft and that one of the aligned shafts with which it is not in constant driving engagement.

4. The invention defined by claim 3, together with a clutch element on the driven shaft, said shiftable means including mechanism on the driving shaft adapted to directly engage the clutch element of the driven shaft in one position of adjustment of said mechanism and to drive the second counter shaft in another position of adjustment.

5. The invention defined by claim 3, together with gears fixed to the driven shaft, said shifting means including mechanism on the first counter shaft having a plurality of gears for selected engagement with the gears fixed to said driven shaft.

In testimony whereof I affix my signature.

PERRY L. TENNEY.